United States Patent [19]

Long

[11] Patent Number: 5,412,767
[45] Date of Patent: May 2, 1995

[54] IMAGE PROCESSING SYSTEM UTILIZING BRUSH PROFILE

[75] Inventor: Robert J. Long, Oxon, England

[73] Assignee: Quantel, Ltd., Newbury, England

[21] Appl. No.: 126,108

[22] Filed: Sep. 23, 1993

Related U.S. Application Data

[63] Continuation of Ser. No. 525,098, May 17, 1990, abandoned.

[30] Foreign Application Priority Data

May 17, 1989 [GB] United Kingdom ............... 8911339
Oct. 13, 1989 [GB] United Kingdom ............... 8923094

[51] Int. Cl.⁶ ............................................. G06F 15/62
[52] U.S. Cl. ................................ 395/133; 395/135; 395/131; 395/129
[58] Field of Search ............... 395/131, 128–129, 395/155, 133, 135; 345/149; 358/445

[56] References Cited

U.S. PATENT DOCUMENTS

| | | | |
|---|---|---|---|
| 4,633,416 | 12/1986 | Walker | 395/131 |
| 4,751,503 | 6/1988 | Kermisch | 340/709 |
| 4,905,164 | 2/1990 | Chandler et al. | 395/131 |
| 5,038,223 | 8/1991 | Yamada | 358/445 |
| 5,153,577 | 10/1992 | Mackey et al. | 345/149 |

FOREIGN PATENT DOCUMENTS

| | | | |
|---|---|---|---|
| 2089625 | 12/1981 | United Kingdom | G09G 1/16 |
| 2113950 | 1/1983 | United Kingdom | H04N 5/22 |

OTHER PUBLICATIONS

Koveos, Atari Manual—"Hyperpaint", 1988, pp. L-1, L-2, I-1, I-2.

Primary Examiner—Almis Jankus
Attorney, Agent, or Firm—Cooper & Dunham

[57] ABSTRACT

An image processing system in which a source patch (35) of pixels is copied from one region of an image to a destination patch (34) of pixels in response to the movement of a stylus (15) over a touch-tablet (16). Each pixel in the destination patch is modified towards the value of its respective pixel in the source patch, and the extent of modification is controlled by brush profile data (36). In one embodiment the source patch 35 and the destination patch (34) are defined in mutually exclusive regions. In another embodiment the source patch and the destination patch are defined in overlapping regions.

22 Claims, 3 Drawing Sheets

IMAGE PROCESSING SYSTEM UTILIZING BRUSH PROFILE

This is a continuation of application Ser. No. 07/525,098 filed May 17, 1990, now abandoned.

FIELD OF THE INVENTION

The present invention relates to electronic image processing and, in particular, to image processing apparatus of the type having means for storing an image frame of intensity related pixel data.

BACKGROUND OF THE INVENTION

Electronic image processing often involves modifying images, such as photographs, to improve them in some way, while maintaining the appearance of a true record of an actual event. "Touching-up" an image is possible with photographic techniques, but such procedures may be carried out with greater ease in an electronic environment, where less special expertise is required on the part of the artist. Thus, electronic systems are available which allow a very large amount of commercial artwork to be enhanced in ways that would be far too expensive if carried out using the photographic approach.

In the enhancement of artwork, a common requirement is for undesirable features, such as man-made objects in a landscape, to be removed. Pixel data from a source portion of an image (the background) is copied to a destination portion, i.e. that occupied by the undesirable object. In a known system, operations of an artist result in the two portions being identified, whereafter the machine replaces pixel values in the destination region with values equal to those in the source region. Thus, each pixel in the destination region has a respective pixel in the source region resulting in a patch of pixels being replicated so as to reproduce the texture of the source region. However, known systems faithfully remove undesirable objects by pixel replication, but they may also introduce new artefacts where the replicated region joins the existing background. Therefore, although providing a fast means of modifying an image, care must be taken to ensure that the modification cannot actually be seen in the finished artwork.

It is an object of the present invention to provide an improved image processing apparatus of the aforesaid type.

SUMMARY OF THE INVENTION

According to one aspect of the invention, there is provided a method of processing image data comprising the steps of: selecting a brush profile defined by a patch of brush-profile data; defining the position of destination patches of image data by the operation of manually operable means; modifying each pixel of a destination patch towards the value of its respective pixel in a source patch of image data at a predetermined distance from said destination patch; and controlling said modification in respect to a respective datum of said brush profile data.

According to another aspect of the invention, there is provided an image processing apparatus comprising: means for storing selected brush-profile data defining a brush profile; means for storing image data; manually operable means for selecting positions of destination patches of said stored image data; and a processor for: modifying each pixel of a selected destination patch towards the value of a respective pixel in a source patch of image data; and controlling said modifications in response to respective brush profile data; wherein the positions of said source patch and said destination patch are defined at a predetermined distance from each other.

The above and further features of the invention are set forth with particularity in the appended claims and together with advantages thereof will become clearer from consideration of the following detailed description of exemplary embodiments of the invention given with reference to the accompanying drawings.

DETAILED DESCRIPTION OF PREFERRED EMBODIMENTS OF THE INVENTION

Figure 1:
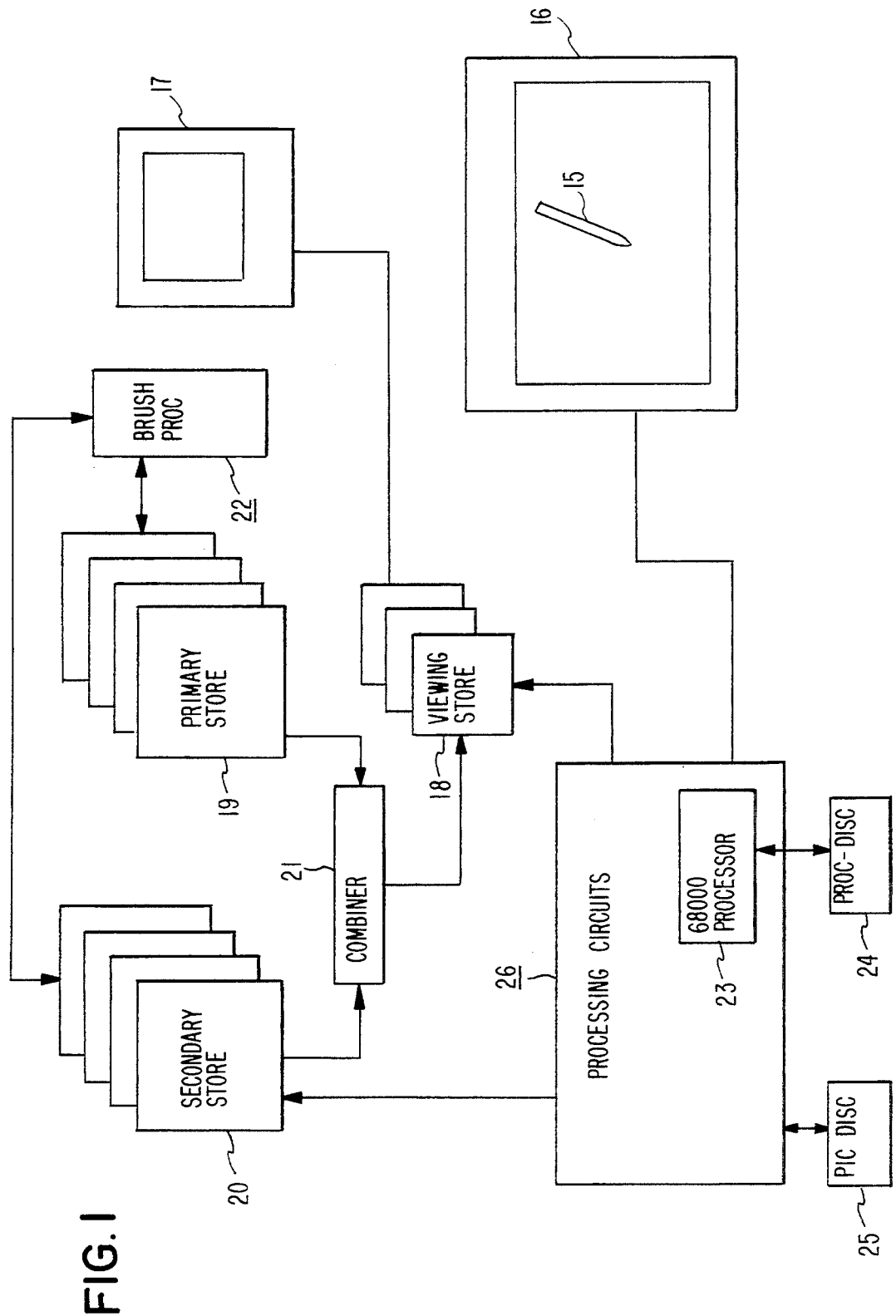
FIG. 1 shows an image processing system arranged to copy image data from a source patch of an image to a destination patch of said image.

A high resolution video graphics system is shown in FIG. 1, in which movement of a stylus 15 over a touch-tablet 16 allows an artist to synthesise the operations of conventional artist's implements within an electronic environment. The process is interactive, with many operations being performed in real-time, allowing the artist to view his work on a high definition colour monitor 17.

Within a main housing of the system, a video signal is generated for the monitor 17 by continually reading from a viewing store 18, at video rate, and converting each of the red, green and blue (RGB) samples to analogue signals, which in turn drive respective colour guns of the monitor 17. The resolution of the viewing store is, therefore, equivalent to that of the displayed picture, with twenty four bits provided for each storage location, which may be regarded as three eight bits planes, one for each of the primary colour separations.

For high quality hard copies, image creation and manipulation are performed on data having higher resolution than that of the displayed image, then, during appropriate periods, areas of the high resolution image, which have been modified, are filtered and the filtered data is written to the viewing store 18. This technique is described in greater detail in U.S. patent application Ser. No. 851,125 (claiming a UK priority date of 13 Apr. 1985 and having an equivalent European Patent Application published as No. 202014) assigned to the present Assignee and included herein as part of the present disclosure. The system is provided with two full resolution stores, a primary store 19 and secondary store 20, each of which may have, typically, approximately 4000 by 6000 storage locations each of thirty two bits.

The 32 bits of each location of stores 19 and 20, may be regarded as four planes of eight bits each, in which three of the planes are for colour signals and the fourth is for a stencil signal. The colour signals may be stored as primary (RGB) values or, alternatively, as secondary values of cyan, yellow and magenta (CYM) which are the separations required for most printing processes. In the CYM system, the data must be converted to RGB values when updating the viewing store 18 and this technique is described in greater detail in U.S. patent application Ser. No. 308,811 (claiming a UK priority date of 11 Apr. 1986 and having an equivalent European Application published as No. 2045943), assigned to the present Assignee and included herein as part of the present disclosure.

The eight bit stencil signals may be created on the system using any of the facilities available for image creation. In addition to masking images, when painting etc, stencils may also be used to combine images during manipulation processes. Thus, part of any image in the secondary store 20 may be cut out and placed into the primary store 19, while using a stencil signal to control the blending of the two images. Techniques for the creation and use of stencils are described in U.S. Pat. No. 4,602,286 assigned to the present Assignee and included herein as part of the present disclosure.

At an operating resolution of approximately 4000 lines, a combiner 21 is required to filter image data from stores 19 and 20 so that one pixel supplied to the viewing store 18 is derived from a four-by-four patch of sixteen pixels. The resulting new pixel is then written to store 18, which overwrites any value previously held at that location. However, the creation of new data in the high definition stores, and the stamping of cut-outs, requires more than a mere overwriting process, so as to avoid the introduction of artefacts produced by aliasing. Techniques for brush stamping, using an interactive read-modify-write process, are described in U.S. Pat. No. 4,514,818 assigned to the present Assignee and included herein as part of the present disclosure.

Each colour separation may be processed in parallel with the other two or, alternatively, they may be processed sequentially on the same hardware. However, in either case, the operation is performed in accordance with the read-modify-write equation on a pixel-by-pixel basis, using the corresponding control value k (for each pixel) from the stencil plane.

Operation of the system is overseen by a suitable microprocessor 23, such as a Motorola 68010 or something of similar power, arranged to receive input signals from the stylus and touch-tablet, and program data from a program disc-drive 24. Disc 24 may also store text and control data, but for the bulk storage of full size high resolution pictures and cut-outs, a separate picture disc-drive 25 is provided. The processor 23 forms part of a processing circuit 26, details of which are disclosed in the assignees copending British Patent Application No. 8909367 which is included herein as part of the present disclosure.

Processor 23 is arranged to generate on-screen menus, which are displayed on monitor 17, in response to swiping the stylus 15 over the edge of the touch-tablet 16. As the stylus is brought close to the working surface of the touch-tablet 16, a cursor is displayed and the stylus is said to be in proximity. Movement of the stylus while in proximity results in similar movement of the cursor over the screen of the monitor. The stylus may be connected to the tablet by a cable or, preferably, the system may operate using a wire-less stylus as described in the Assignee's copending British Patent Application No. 8908612 included herein as part of the present disclosure.

The stylus is also pressure sensitive, producing a signal which varies over several levels as pressure is applied thereto and a function is selected from a menu by applying pressure to the stylus after positioning the cursor over the box identifying that function. Thus, before initiating the painting of a stroke, the operating artist selects a brush colour, a brush size and a type of brush (e.g. chalk, paintbrush or air brush). After swiping the stylus off the edge of the touch-tablet, in order to remove the displayed menu, the artist may then "paint" into the image by moving the stylus over the tablet while the stylus is in pressure. A stroke is made up of a series of overlapping stamps, each consisting of a patch of pixels which are read, modified and then written back to the store (usually the primary store 19) by the brush processor 22.

Another function which may be selected from the displayed menu, is "shift brush" which provides operation in accordance with the present invention. An image frame is supplied to (or created within) the primary store 19 and displayed on the monitor 17 via the viewing store 18. After selecting "shift brush" from a displayed menu, an operating artist swipes off to remove said menu and then brings the stylus 15 back into operating proximity. When in proximity, the cursor (preferably having a different colour to that for normal operation) is displayed which, on placing the stylus, becomes a fixed corner of a rectangle. Further movement, while in proximity but out of pressure, allows the diagonally opposite corner of the rectangle to be defined and placing the stylus into pressure again fixes the position of the opposite corner. If, before the second corner has been fixed, the stylus is taken out of proximity, the procedure is re-set to the point of redefining the first corner.

After defining the rectangle, the system is ready to copy pixels from a source patch, the centre of which being at said first defined corner, to a destination patch having the centre at said second defined corner. While keeping the stylus in proximity, the rectangle responds to stylus movements (in the same way in which a cursor would during normal painting) with the second defined corner representing the cursor position. However, as each brush stamp is made, (into a destination patch) the new data does not represent a fixed colour (as in normal painting) but is obtained from the source patch, resulting in each pixel of the destination patch being modified towards the same value as a respective pixel in the source patch.

Figure 2:
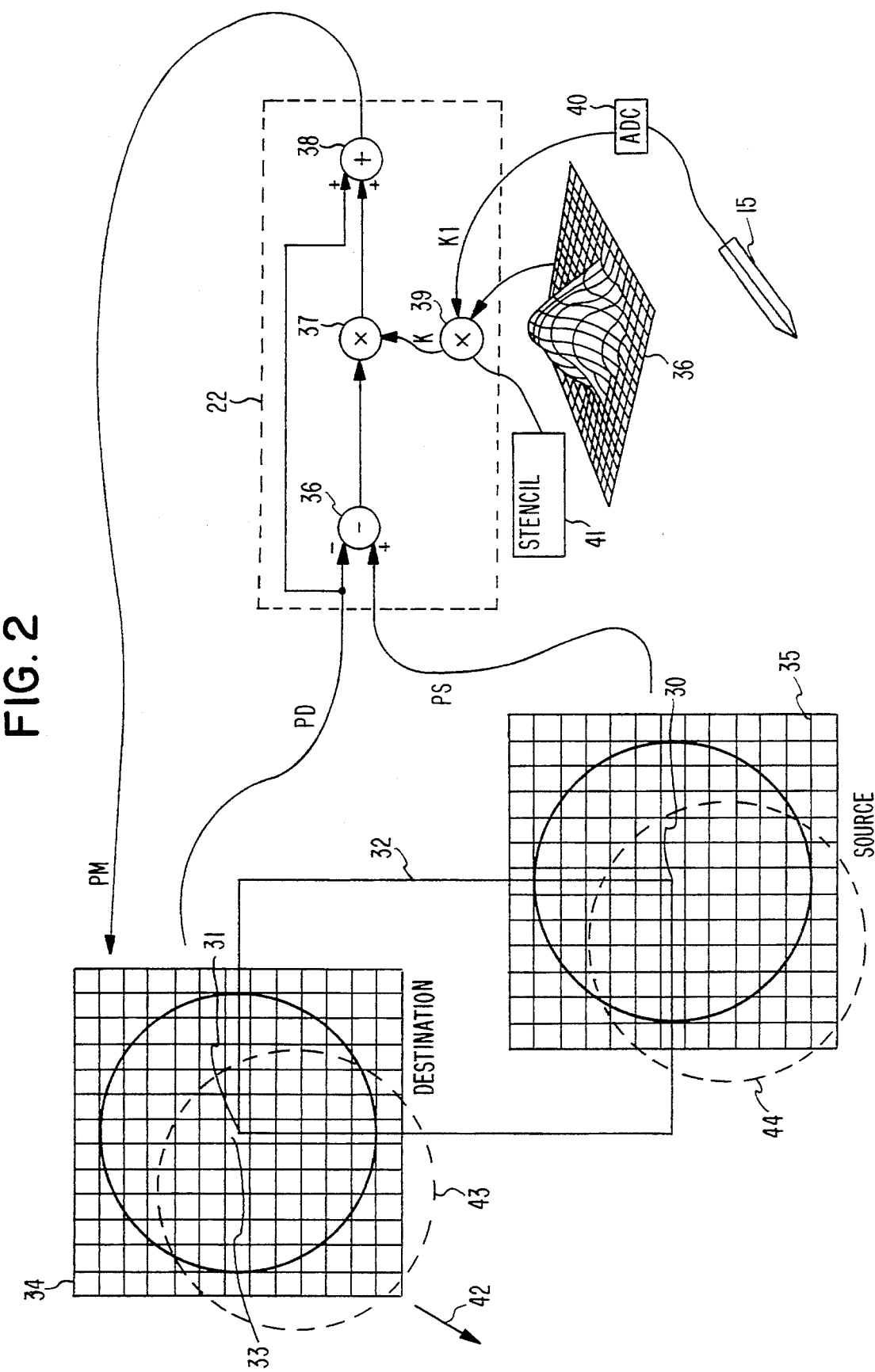
FIG. 2 illustrates one way of copying of pixel data by the system shown in FIG. 1.

A diagrammatic representation of the operation of the "shift brush" function is shown in FIG. 2, which also details an embodiment of the brush processor 22. A frame of image data is stored in the primary store 19 and on selecting shift brush as previously described, means are provided for copying image data from a first patch (which will be identified as a source patch) to a second (i.e. destination) patch of the image. The position of each patch is determined by an operation of the stylus, which (in the example shown in FIG. 2) has been used to define a first corner 30 and a second corner 31 of a rectangle 32. Movement of the stylus, in the manner adopted for conventional painting, now results in movement of the rectangle 32 over the image displayed on the monitor 17.

The size of each patch is determined by the size of the selected brush and all the brushes available for normal painting are available for brush shifting. In the example shown, a brush lying within a square patch of 13×13 pixels has been selected and the brush profile data is represented graphically in FIG. 2 as a three-dimensional shape 36, with a circular base, placed over a pixel grid. Each datum of a brush profile is therefore represented as a three-dimensional volume or peg profile above its respective grid position and the numerical value at a position is therefore obtained from a projection of this volume onto the pixel area. Profiles may be moved by less than a pixel spacing, therefore sixty-four peg profiles are stored for each brush, allowing patches to be modified at a resolution of 8 times that of the pixel spacing, which, in addition to soft edged brushes, also assists in the avoidance of introducing artefacts during the pixel copying process.

Once the rectangle 32 has been defined, the system is ready to start pixel replication. As the stylus 15 is moved over the tablet, while in proximity but not in pressure, the displayed rectangle 32 moves in sympathy. Putting the stylus into pressure starts the copying process and corner 31 defines the centre pixel 33 of a destination patch 34. The brush processor 22 then reads each pixel of the destination patch 34, in parallel with respective pixels of a source patch 35 and respective data of a selected brush profile 36.

A pixel value from the source path 35 is identified as Ps whilst its corresponding pixel on the destination patch is Pd and the new modified value is Pm. The brush profile signal contributes to a control value K and the modified value Pm is given by:

$$Pm = K \cdot Ps + (1-K)Pd$$

This equation may be re-written as follows:

$$\begin{aligned} Pm &= K \cdot Ps + Pd - KPd \\ &= K(Ps - Pd) + Pd \end{aligned}$$

Therefore, in the brush processor 22, a subtractor 36 calculates Ps−Pd which is multiplied by K in a multiplier 37 then added to Pd in an adder 38. The new modified value Pd then overwrites the Pd value and the process continues until all pixels in the destination patch have been supplied to the brush processor 22.

The brush processor 22 also includes a second multiplier 39 which multiplies brush profile values with stylus pressure values from an analogue to digital converter 40 and, when selected, stencil signals from a stencil store 41. If the stylus is moved after a patch has been modified, a second patch will be modified which overlaps the previously modified patch. When normal brushes are selected, a new stamp is made at a position determined by movement of the stylus but when airbrush is selected stamping is controlled with respect to time. Thus, if the stylus is moved in the direction indicated by arrow 42 a new patch will be modified, identified by the dotted circle 43 taking data from the patch identified by dotted circle 44.

The two full resolution stores 19 and 20 may be used for the shift brush operation by supplying a copy of the same data to both stores, parallel reading of the source and destination patches is then simplified by reading the source patch from the secondary store 20 while modifying a patch in the primary store 19. In the preferred type of shift brush, the patches are derived from mutually exclusive parts of the image. However, by allowing the source and destination patches to overlap, it is possible to achieve a smearing effect as will now be described.

The "shift brush" function as described hereinabove facilitates delicate retouching and also the extension of textured areas over missing or flawed parts of an image by enabling the user to move data representing texture quickly from one part (the source) of the picture to another (the destination). A related brush effect is a "smear brush" function.

The apparatus by which the "smear brush" functions is implemented is identical to that shown in FIG. 1 of the accompanying drawings and thus requires no further explanation herein. As with the "shift brush" function, "smear brush" is selected from a displayed menu and the operator then swipes off to remove said menu and then brings the stylus back into operating proximity of its associated touch tablet. When in proximity a cursor is displayed over the image on the monitor and responds to stylus movements to enable the user to move the stylus over an area of the image to be modified by the "smear brush" function.

Figure 3:
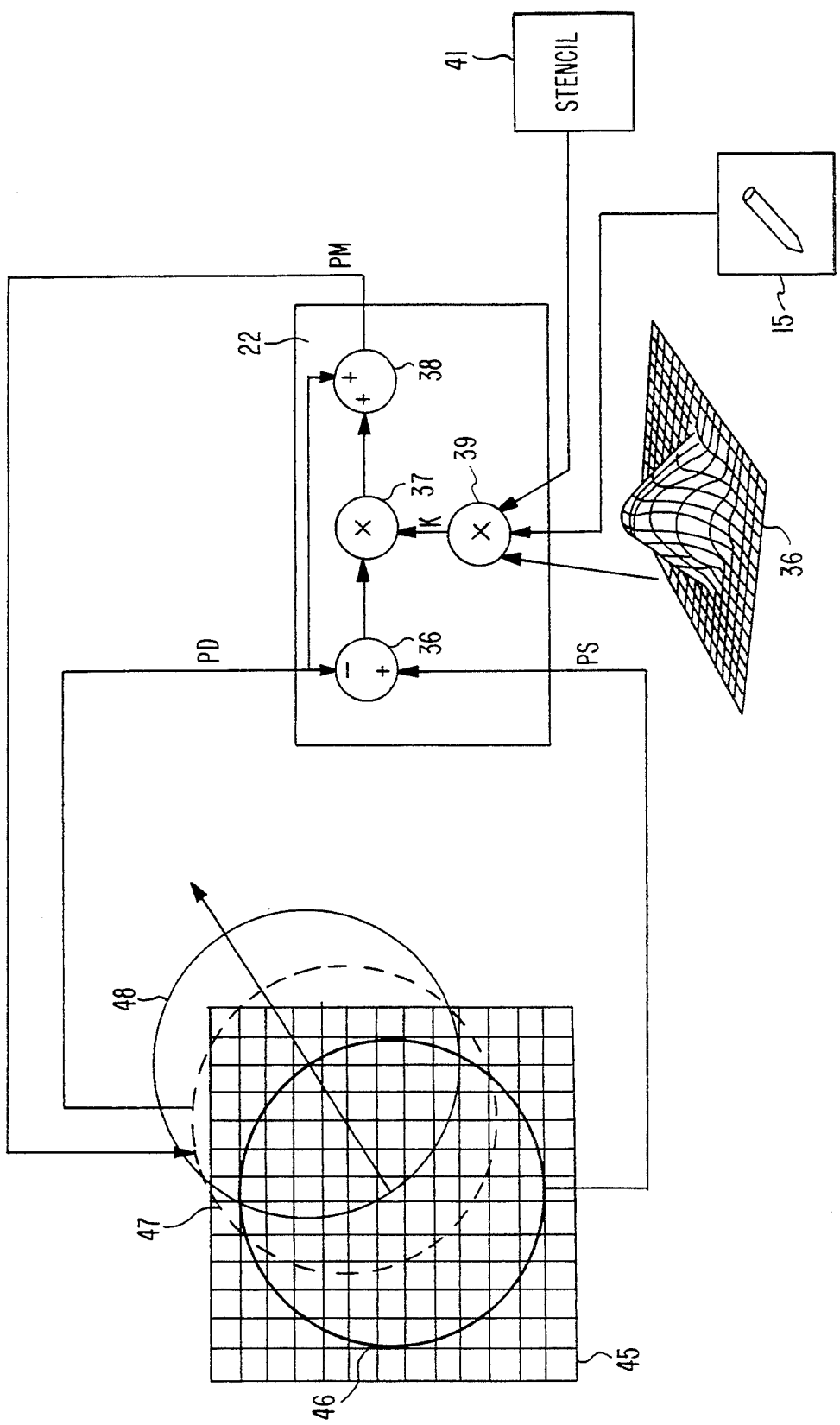
FIG. 3 illustrates another way of copying pixel data by the system of FIG. 1.

Referring now to FIG. 3 of the accompanying drawings, pixel data relating to an image to be modified is stored in a framestore and read for display on the monitor 17. When pressure is applied to the stylus 15 a source patch is identified in a portion 45 of the framestore that corresponds to addresses in the vicinity of the position of the cursor on the monitor. The source patch is defined as the area covered by the first brush stamp 46 to be generated. Brush stamps are generated at regular time intervals and a destination patch is defined as the area covered by the next brush stamp 47 to be generated, for example. Of course, the destination patch can be defined as the area covered by a later brush stamp if so desired, but the "smear brush" function works most effectively if the next brush stamp is used.

With the source and destination patches 46, 47 defined, pixel data in these patches are written to a brush processor 22 which, as described hereinabove, adds source pixel data Ps with destination pixel data Pd to produce modified pixel data Pm in accordance with the equation:

$$Pm = KPs + (1-K)Pd$$

where K is a coefficient determined by multiplying together the brush shape profile 36, stylus pressure from the stylus/touch tablet combination 15 and, when used, control image data held in stencil store 41. The modified pixel data Pm is therefore a weighted sum of at least the source Ps and destination Pd pixel data.

Once calculated the modified pixel data is written to the destination patch 47, replacing the data previously there. The next source patch is then defined by the next brush stamp 48 generated and the next destination patch (not shown) i.e. the brush stamp generated after brush stamp 48.

Thus, when the stylus is moved over the touch tablet the "smear brush" function causes portions of the image to be combined with other portions in the same vicinity. Since brush stamps are generated at regular time intervals, source and destination patches will normally overlap when the stylus is moved at a normal drawing speed and the effect of the "smear brush" functions will be similar to that of say a wet paint brush being drawn across a watercolour painting.

The "smear brush" function makes a variety of creative effects possible, for example making motion blurs easy to implement in a selective fashion without blurring vital details in the picture. Because the system is electronic, the "smear brush" function can be carried out along straight lines if required and can be automatically tapered from a strong to a faint effect along a line. Stencils can be "smeared" as well as pictures.

In a modification to the above described embodiments the patch of profile data representing the brush is not prestored in memory but is instead defined as a mathematical expression from which each datum in the profile is calculated "on the fly", i.e. as it is required. This offers greater flexibility and enables a wider range of brush profiles to be defined. The present invention is intended to cover such a modification.

Having thus described the present invention by reference to preferred embodiments it is to be well understood that the embodiments in question are exemplary only and that modifications and variations such as will occur to those possessed of appropriate knowledge and skills may be made without departure from the spirit and scope of the invention as set forth in the appended claims and equivalents thereof.

I claim:

1. A method of processing image data defining a multiplicity of pixels which together form an image, the method comprising the steps of:

selecting data defining a brush profile;

employing operator means to define a destination position in the image and to define a source position in the image different than the destination position such that there is a predetermined displacement relationship between the destination position and the source position, and repeating a cycle of:

delineating a destination patch corresponding to a first region of the image including the destination position, the destination patch comprising an array of pixels each having an associated image data value, delineating a source patch corresponding to a second region of the image including the source position, the second region being different than the first region and comprising an array of pixels each having an associated image data value; and modifying the image data value of each pixel of the destination patch in dependence upon the image data value of both said destination patch pixel and the corresponding source patch pixel and in dependence upon the brush profile data, the destination and source patches of each cycle differing in position from the destination and source patches of the preceding cycle.

2. The method according to claim 1, in which said first region and said second region are non-overlapping.

3. The method according to claim 1, further comprising the step of changing the positions of the source patch and the destination patch in response to manipulation of said operator means.

4. The method according to claim 3, in which the destination and source patches are separated by a fixed distance set by the operator means.

5. The method according to claim 4, in which the destination and source patches are linked for movement together.

6. The method according to claim 5, in which a video signal is derived from said image data and supplied to a monitor for display of the image represented thereby and an indicator is also displayed on said monitor in response to manipulation of said operator means, said indicator defining the position of at least said destination patch.

7. The method according to claim 6, in which said indicator moves in response to manipulation of the operator means.

8. The method according to claim 7, in which said indicator is rectangular, and different corners of said rectangular indicator are positioned respectively at the source position and at the destination position.

9. The method according to claim 1, in which said first region and said second region are overlapping.

10. The method according to claim 9, in which the destination position is defined a predetermined time interval after the defining of the source position.

11. The method according to claim 1, wherein said predetermined displacement relationship is spatial when performing a shift brush function and said predetermined displacement relationship is temporal when performing a smear brush function.

12. An image processing apparatus for processing image data defining a multiplicity of pixels which together form an image, the apparatus comprising:

a store for storing data defining a brush profile;

operator means for defining a destination position and for defining a source position having a predetermined displacement relationship with the destination position; and a processor for repeating a cycle of:

delineating a destination patch corresponding to a first region of the image including the destination position, the destination patch comprising an array of pixels each having an associated image data value;

delineating a source patch corresponding to a second region of the image different than the first region and comprising an array of pixels each having an associated image data value;

modifying the image data value of each pixel of the destination patch in dependence upon the image data value of both said destination patch pixel and the corresponding source patch pixel and in dependence upon the brush profile data, the destination and source patches of each cycle differing in position from the destination and source patches respectively of preceding cycle.

13. Apparatus according to claim 12, wherein the operator means is adapted to locate said patches in non-overlapping regions of the image.

14. Apparatus according to claim 13, wherein said operator means is adapted to locate said patches in regions mutually separated by a predetermined distance.

15. Apparatus according to claim 12, wherein said operator means is manipulable to effect movement of at least the destination patch.

16. Apparatus according to claim 15, wherein said operator means is adapted to link said destination and source patches for movement together.

17. Apparatus according to claim 12, further comprising a monitor for display of a video signal derived from said image data and, in response to said operator means, for display of an indicator which defines the position of at least the destination patch.

18. Apparatus according to claim 17, wherein said monitor is adapted to cause said indicator to move on said monitor in response to manipulation of the operator means.

19. Apparatus according to claim 12, wherein said operator means is adapted to delineate said destination and source patches in overlapping regions of said image.

20. Apparatus according to claim 19, wherein said operator means is adapted to define said destination position at a predetermined time interval after said source position is defined.

21. An apparatus according to claim 12, further comprising first storage means for storing data defining an initial version of said image and second storage means for storing data defining a modified version of said image, image data defining said source patch being stored in said first storage means and image data defining said destination patch being stored in said second storage means.

22. The apparatus according to claim 12, wherein said predetermined displacement relationship is spatial when performing a shift brush function and said predetermined displacement relationship is temporal when performing a smear brush function.

* * * * *